UNITED STATES PATENT OFFICE.

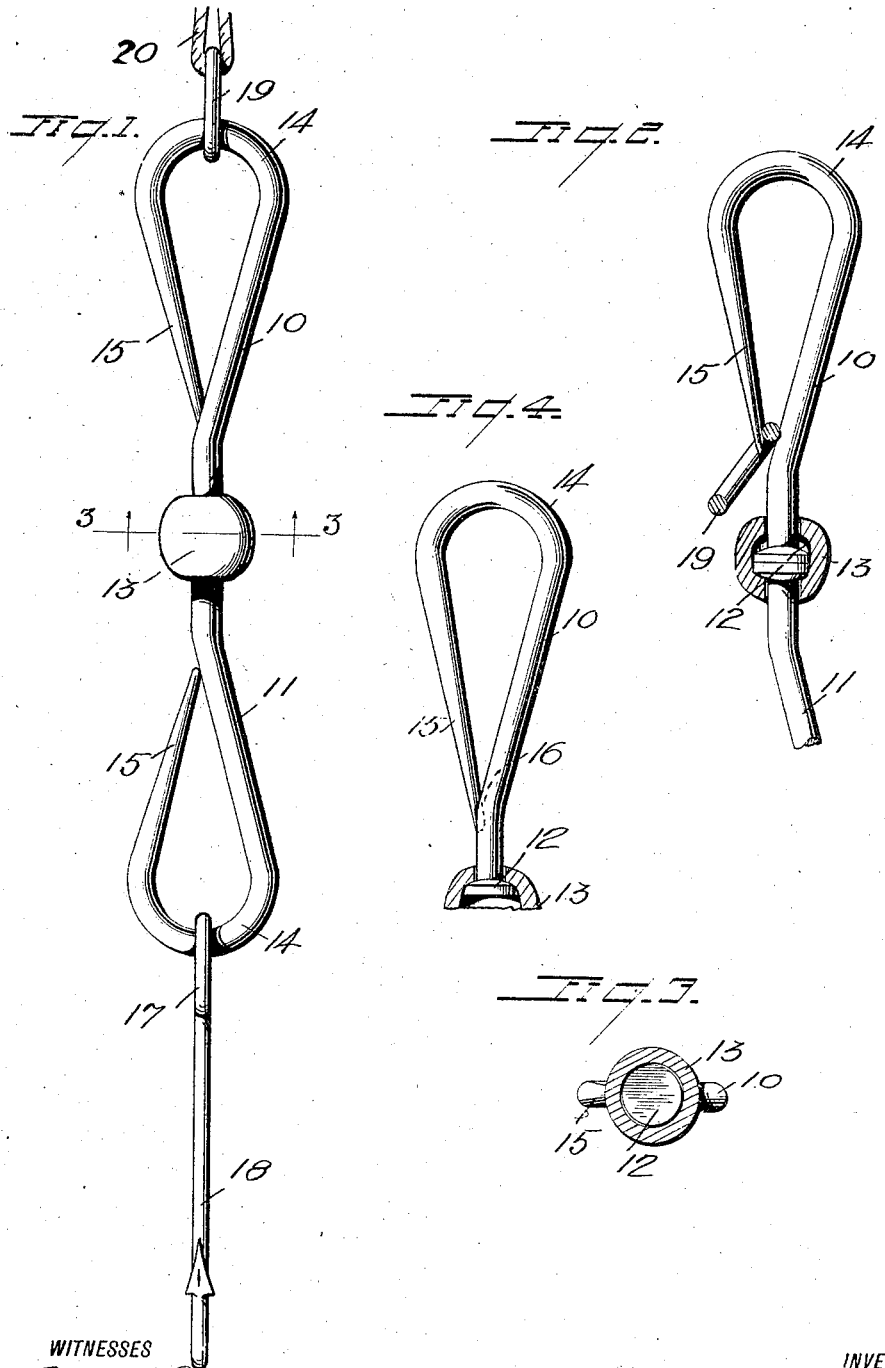

CLIFTON LOVEJOY JOHNSON, OF SAVANNAH, GEORGIA.

DOUBLE-SWIVEL CONNECTING-LINK FOR FISHING-LINES.

1,306,226.  Specification of Letters Patent.  Patented June 10, 1919.

Application filed June 29, 1917. Serial No. 177,827.

*To all whom it may concern:*

Be it known that I, CLIFTON LOVEJOY JOHNSON, a citizen of the United States, and a resident of Savannah, in the county of Chatham and State of Georgia, have invented a new and useful Improvement in Double-Swivel Connecting-Links for Fishing-Lines, of which the following is a specification.

My present invention relates generally to swivels for fishing lines utilized to connect the hook to one end of the line in such manner as to permit of free rotative movements thereof, my object being the provision of an attaching swivel capable of ready and quick attachment both to the hook and to the respective end of the fishing line.

A further object of my invention is to provide a swivel having maximum strength in all of its parts with a maximum spring action, whereby the end of a fishing line or a ring of the fishing line may be quickly engaged and disengaged as well as the eye of a hook.

Many connecting links now in use require the use of a hook having a leader, and independent of the swivel feature it is, therefore, another object of my invention to provide a device which, while capable of being used with a hook having a leader, is particularly designed and adapted for use in connection with the more common form of hook having its shank provided with a rigid eye.

In the accompanying drawing, illustrating my present invention,

Figure 1 is an elevation of my improved double swivel attaching member, illustrating the practical application thereof.

Fig. 2 is a vertical section showing the initial application or removal of the ring of the fishing line from one portion of the attaching member.

Fig. 3 is a cross section taken substantially on line 3—3 of Fig. 1.

Fig. 4 is a partial sectional view illustrating a slightly modified form.

Referring now to these figures, my invention consists essentially of a pair of swivel shanks 10 and 11 preferably formed of sections of material circular in cross section and extending in opposite directions, the inner adjacent ends of said shanks having enlargements 12 disposed within a hollow connecting body 13 through openings in the opposite ends of which the shanks 10 and 11 extend, the enlargements 12 thereof preventing complete removal and providing for relative rotation of the two shanks.

Each of the shanks 10 and 11 has a bent opposite and outer end forming an attaching loop 14, as small as its particular use will justify, and which is provided with a straight tapering extremity 15 projecting at an angle to the shank with its free end adjacent thereto, it being noted that the extremity either lies flat against the shank as in Figs. 1 and 2, or projects into a conformably shaped recess 16 intermediate the ends of the shank, as seen in connection with the tapering extremity 15 of Fig. 4, the object being to prevent a fish, in his twisting and turning, from hooking a loop of a line or leader over the extremity and pulling it through, and thus escape.

This construction provides maximum flexibility in permitting the tapering extremity 15 to be sprung outwardly from the shank in permitting of the association with the loops 14 of either the eye 17 of a hook 18 or the ring 19 of a fishing line 20, both as seen in Fig. 1.

The construction described further provides for maximum strength in that the full diameter of the shank may be extended through the attaching loops 14, as shown.

It is obvious, therefore, that in view of the movable relation of the shanks with their attaching loops the ready manner in which the parts to be joined may be associated therewith and disassociated therefrom, and the strength thereof, my invention provides a highly practicable and useful attachment or connection for fishing lines utilized in the manner described.

I claim:

1. A hook attaching double swivel for fishing lines consisting of a pair of swivel shanks having enlargements at one end adjacent to one another, and a hollow connecting body through opposite ends of which the said shanks loosely extend, and in which said enlargements are loosely disposed, each of said shanks having a bent opposite and outer end forming an attaching loop provided with a straight tapering extremity projecting at an angle to the shank with its free end adjacent and in close engagement therewith, the full diameter of the shank being extended through the curved portion of said loop for the purpose described.

2. A hook attaching double swivel for fishing lines consisting of a pair of swivel shanks having enlargements at one end adjacent to one another, and a hollow connecting body through opposite ends of which the said shanks loosely extend, and in which said enlargements are loosely disposed, each of said shanks having a bent opposite and outer end forming an attaching loop provided with a straight tapering extremity projecting at an angle to the shank, said shank having a recess into which the said extremity projects for the purpose described.

CLIFTON LOVEJOY JOHNSON.

Witnesses:
G. R. MOREHOUSE,
GEORGE R. HERBERT.